UNITED STATES PATENT OFFICE.

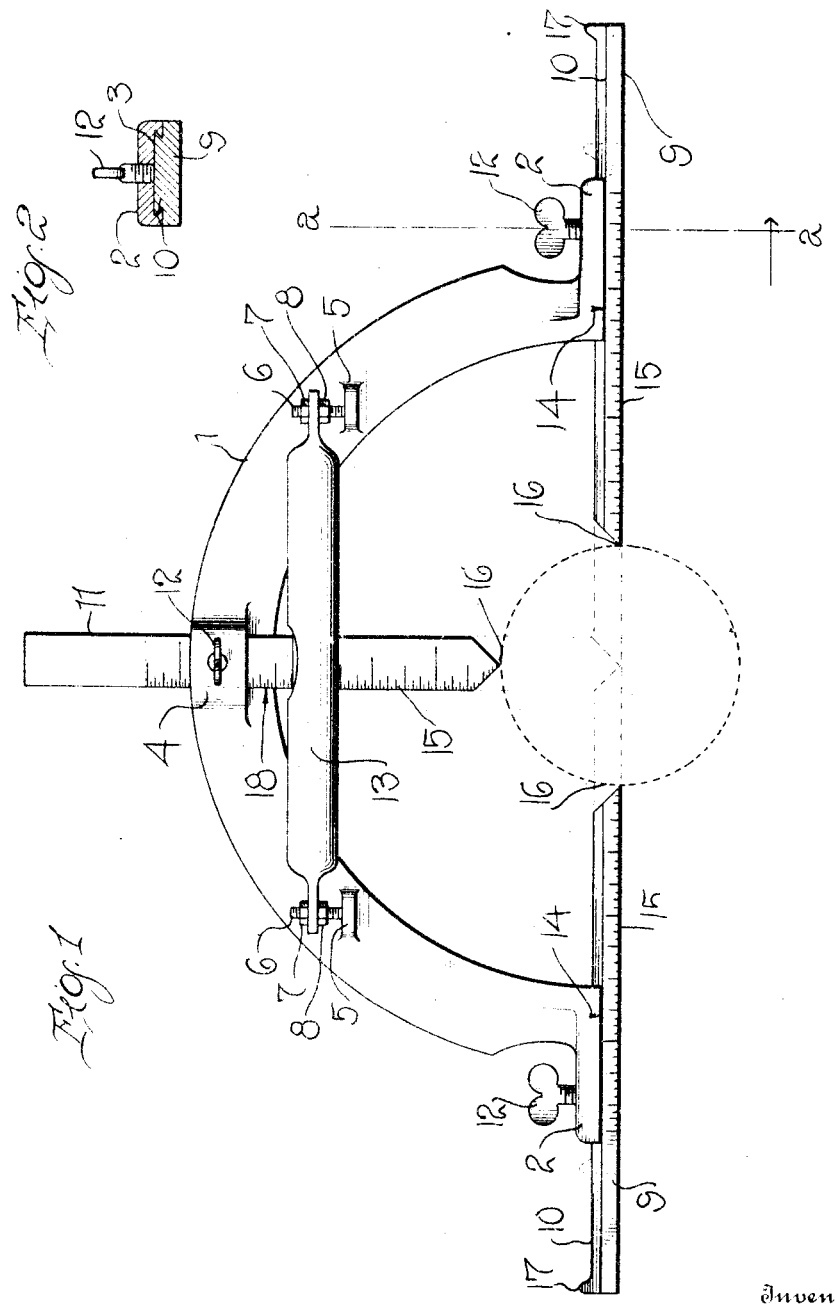

MART BERTHOLD, OF OLEX, OREGON.

CALIPER-GAGE.

1,127,955. Specification of Letters Patent. Patented Feb. 9, 1915.

Application filed August 8, 1914. Serial No. 855,869.

*To all whom it may concern:*

Be it known that I, MART BERTHOLD, a citizen of the United States, residing at Olex, in the county of Gilliam and State of Oregon, have invented certain new and useful Improvements in Caliper-Gages, of which the following is a specification, reference being had to the accompanying drawings.

My invention relates to certain new and useful improvements in caliper gages especially designed for use in babbitting boxes of all kinds of journals.

It has for its object to provide an instrument which, while being simple in construction, yet shall be absolutely reliable as to results.

With these ends in view my invention consists in the details of construction and arrangement hereinafter more particularly described.

In order that those skilled in the art to which my invention appertains may know how to make and use my improved gage, I will proceed to describe the same referring by numerals to the accompanying drawing in which—

Figure 1 is a side elevation, the circle in broken lines indicating a journal, and Fig. 2 is a detail section taken on the line *a—a* of Fig. 1.

Similar reference numerals indicate like parts in both figures of the drawing.

1 is a true semicircular metallic body formed at the extremities with diametrically projecting teeth 2, formed with longitudinal dove-tail grooves 3 (see Fig. 2), the purpose of which will be presently explained, and at its center with an enlargement 4, having a vertical passage therein to be referred to directly. This body 1 is also formed with two lugs 5, directly opposite one another and each is provided with a vertical threaded stem 6, adapted to receive nuts 7 and 8. Slidably mounted on the lateral projections and in the dove-tail grooves 3 of the feet are two caliper gages 9 formed with longitudinal dove-tails 10, as clearly shown in Fig. 2. 11 is a third caliper gage slidably mounted in the enlargement 4 and graduated in inches or fractions thereof, it being of course understood that any other unit of measure than inches may be employed. Set screws 12 are provided for securing the several caliper gages 9, 9, and 11 in any adjusted position. It will be noted that the two gages are disposed in exact alinement with each other and that the vertical gage 11, if formed with inch graduations and with graduations showing fractions of an inch, is disposed at right angles to the horizontal gages 9 and at a point equi-distant between the feet 2.

Mounted at its ends upon the screw threaded stems 6 is a level 13 which may be accurately adjusted by means of the nuts 7 and 8 in an obvious manner.

From the construction shown and described it will be readily understood that the level and the three gages may be easily removed from the semicircular body 1 and with equal facility reassembled, and that when not in use and it is desired to reduce it to smaller compass and at the same time protect the knife edge termini of the gages, the said calipers may be brought together as shown in broken lines at Fig. 1 and secured in such relation by the set screws 12.

The feet 2 are each provided at a definite locality with a gage mark 14 and all of the calipers are provided with the necessary graduations 15. The caliper blades may of course be graduated in inches or fractions of inches, or any other suitable unit of measure may be used. The approaching or inner ends of the calipers terminate in knife edges 16 as clearly shown in Fig. 1, while the outer extremities are fashioned at 17 to constitute a convenient means for adjusting them within their guiding supports 2.

By reference to Fig. 1 it will be seen that if the gages 9 and 11 are so disposed that like graduation marks on each blade coincide with the indices 14 and 18, then the knife edges of the three blades will intersect the circumference of the circle and, the center of which will be on a line connecting the gages 9 and intersected by a median line projected from the gage 11. The calipers may therefore be used in the manner of ordinary calipers to determine if the surface of a cylindrical body is true, and the calipers may of course be turned around the cylindrical body for this purpose. In addition to the ordinary use, however, my improved calipers are particularly adapted for leveling and babbitting journal boxes of all kinds.

Assuming now that the cylindrical body described by broken lines in Fig. 1 is a shaft resting in the lower section of a journal box and that the gages 9 rest upon the upper face of this journal box, it will be obvious that by setting the gages as shown in Fig.

1 the size of the shaft will be shown. The top gage 11 is for the purpose of regulating the number of shims or liners that should be placed between the upper section of the box and the lower section thereof, and after the center of the shaft is located by the use of the calipers, the lower section of the box is lifted and leveled by means of the level 13. Thumb screw 12 is then loosened and the top gage 11 is moved downward until the graduation one and one-half is disposed opposite to the index (assuming that the shaft is three inches in diameter). If it is required to put a one-quarter inch liner between the per and lower sections of the box, then the top gage is raised one-eighth of an inch above the center line of the shaft. The top gage will then show one and five-eighths inches; the shaft is then raised up in the box until it comes in contact with the top gage. The shaft is thus disposed one-eighth of an inch above the center line. One-quarter inch liners are then disposed between the lower half and the top half of the journal box, and the position of the shaft has been accurately gaged. It is obvious that the gage may also be used for leveling the shaft as well as accurately locating the shaft.

It will be noted that because the blade 11 and the blades 9 are independently adjustable the device is also capable of use in measuring irregular forms, though it is specifically adapted to the purpose which has already been pointed out, for the reason that the under sides of the blades 9 are disposed in the same plane and are flat, so that they may be set flat down upon the lower member of a journal bearing and thus disposed in correct position with relation to the bearing, and with the blade 11 disposed in a plane exactly at right angles to the plane of the under faces of the blades 9.

What I claim as new and desire to secure by Letters Patent is:

1. A caliper gage comprising a body having feet spaced from each other and disposed in the same plane, and a middle portion arching over the space between the feet, oppositely disposed blades slidably mounted upon the feet and independently shiftable toward or from each other, the outer faces of said blades being disposed in the same plane and in a plane at right angles to the plane of the middle portion of the body, and a blade disposed at right angles to the first named blades and mounted upon the middle of the body, said blade being independently shiftable toward and from the plane of the first named blades.

2. A caliper gage comprising a body having feet disposed in spaced relation and in the same plane, the faces of said feet being each formed with a dove-tailed groove, a middle portion formed with and arching over the space between the feet and formed at its middle with a perforation extending at right angles to the plane of the feet, blades, each formed with a dove-tailed rib engaging the dove-tailed groove on the faces of said feet, a blade passing through said perforation and independently adjustable toward or from the plane of the first named gage blades, and means for holding each of said blades in its adjusted position.

3. A caliper gage including a body having feet disposed in the same plane, a middle portion arched over the space between the feet, oppositely disposed gage blades mounted upon the outer faces of the feet and having their under faces disposed in the same plane, and at right angles to the plane of the middle portion of the body, and a gage blade disposed at right angles to the plane of the under faces of the first named gage blades and adjustably mounted upon and shiftable toward or from the plane of the first named gage blades.

4. A caliper gage comprising an arcuate body, the extremities of which are formed with outwardly turned feet disposed in a plane at right angles to the plane of the body, the under faces of the feet being formed with dove-tailed grooves, oppositely disposed gage blades slidably mounted in said grooves of the feet and independently shiftable toward or from each other, means on the feet for holding the gage blades set in adjusted position, a gage blade at right angles to the first named gage blades and disposed midway between the feet and adjustable toward or from the plane of the first named gage blades, means for holding the second named blade in its adjusted position, a level extending parallel to the first named gage blades, and means for supporting the extremities of the level upon the arcuate body and for adjusting the level.

5. A caliper gage comprising a supporting body, a pair of oppositely disposed gage blades, the outer faces of said gage blades being flat and disposed in the same plane, the top of said gage blades being disposed entirely below the adjacent portion of the end face of the body, a gage blade disposed at right angles to the first named blades on a line midway between them, all of said blades being adjustable toward or from a common point, and a level mounted upon said supporting body.

In testimony whereof I hereunto affix my signature in the presence of two witnesses.

MART BERTHOLD.

Witnesses:
C. F. WADE,
S. M. DUPRAZ.